United States Patent [19]
Belcher et al.

[11] 4,328,482
[45] May 4, 1982

[54] REMOTE AC POWER CONTROL WITH CONTROL PULSES AT THE ZERO CROSSING OF THE AC WAVE

[75] Inventors: Paul E. Belcher, Los Angeles; Daniel Hobel, Whittier, both of Calif.

[73] Assignee: Consumer Electronic Products Corporation, Canoga Park, Calif.

[21] Appl. No.: 226,936

[22] Filed: Jan. 21, 1981

Related U.S. Application Data

[63] Continuation of Ser. No. 852,211, Nov. 17, 1977, abandoned.

[51] Int. Cl.³ .............................................. H04B 3/54
[52] U.S. Cl. ................................ 340/310 A; 307/140; 340/825.57
[58] Field of Search ........ 340/310 R, 310 A, 310 CP, 340/167 R; 307/3, 140; 179/2.51; 455/352; 375/23, 25, 36, 37, 94; 178/69 B, 69 D, 69 M, 69 N

[56] References Cited

U.S. PATENT DOCUMENTS

| | | |
|---|---|---|
| 2,476,990 | 7/1949 | Mason . |
| 2,999,925 | 9/1961 | Thomas . |
| 3,488,517 | 1/1970 | Cowan et al. ................... 340/310 A |
| 3,594,584 | 7/1971 | Woods ..................................... 307/3 |
| 3,689,886 | 9/1972 | Durkee ........................... 340/310 A |
| 3,714,451 | 1/1973 | Whitney et al. ................. 340/310 R |
| 4,060,735 | 7/1976 | Pascucci et al. ........................ 307/3 |

FOREIGN PATENT DOCUMENTS

1117309 6/1968 United Kingdom .

Primary Examiner—James J. Groody
Attorney, Agent, or Firm—Charles H. Schwartz; Ellsworth R. Roston

[57] ABSTRACT

A remote control for the control of AC power uses the AC power wave of an existing AC power line for the transmitting control signals from a control location to a remote location. A transmitter at the control location provides a predetermined number of control pulses to the AC power line and includes at least one breakdown device and at least one capacitor in series across the AC power line. The actuation of the transmitter provides triggering of the one or more breakdown devices at at least one peak point of the AC power wave and with the triggering corresponding to the predetermined number of control pulses for providing a charging of the one or more capacitors substantially to one half of the peak to peak value of the AC power wave at the predetermined number of points and triggering of the one or more breakdown devices at the zero crossing points of the AC power wave to discharge the one or more capacitors to provide high frequency pulses having amplitudes substantially equal to one half of the peak to peak value of the AC power wave. A receiver at the remote location includes a detector which is enabled only at the zero crossing points so as to detect the presence of the control pulses only at that time.

7 Claims, 16 Drawing Figures

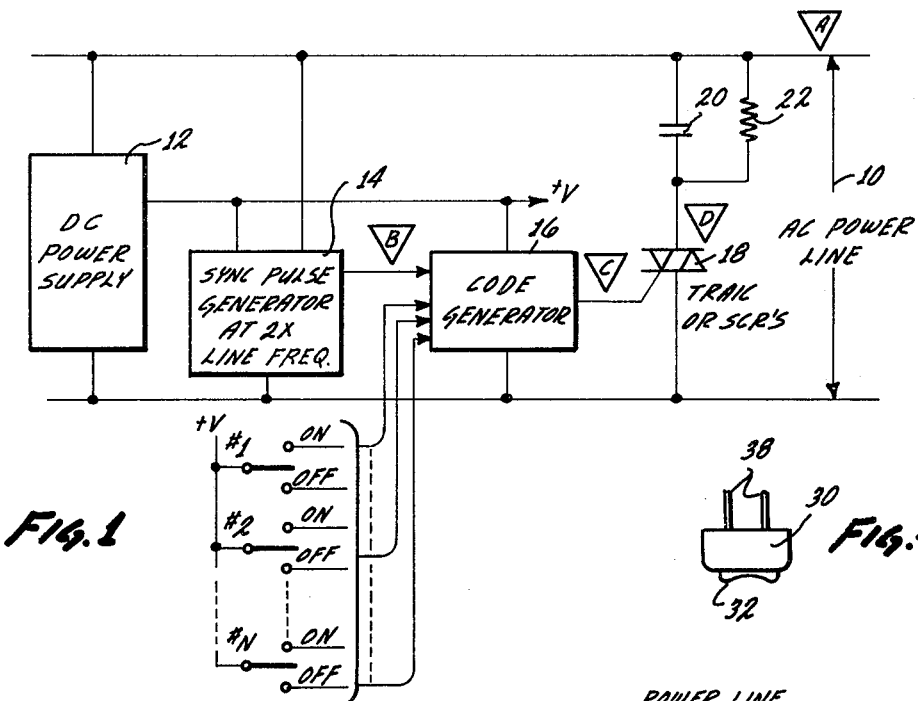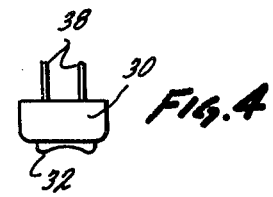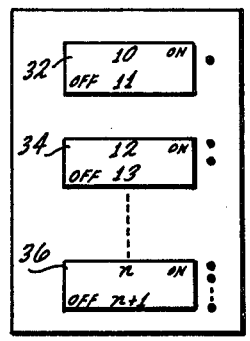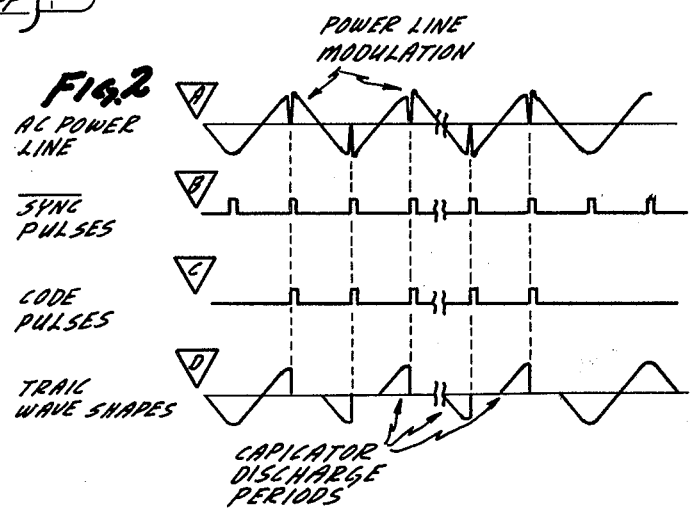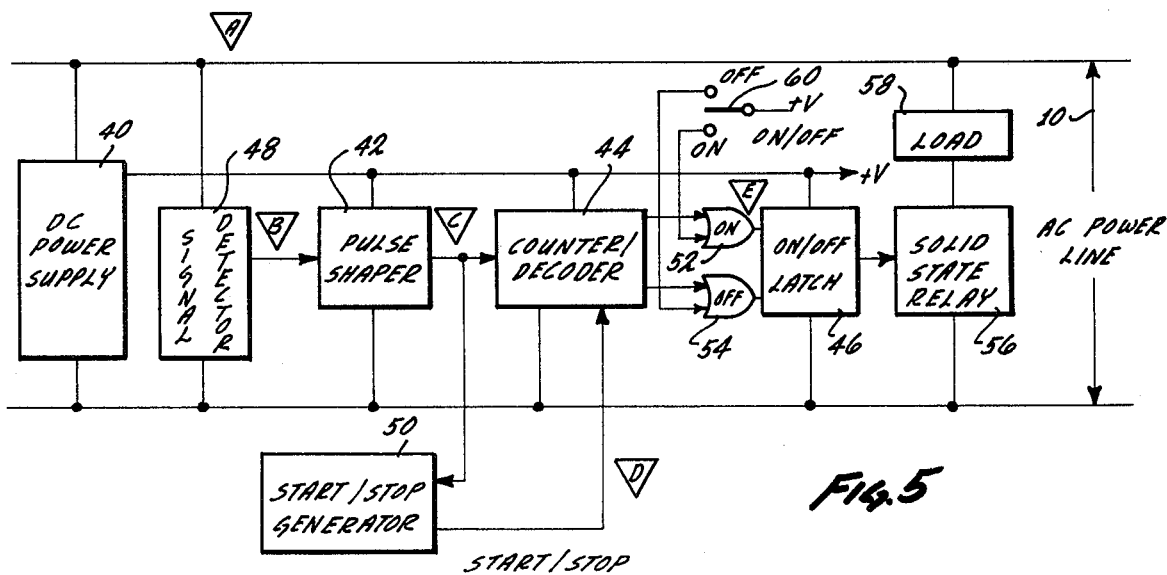

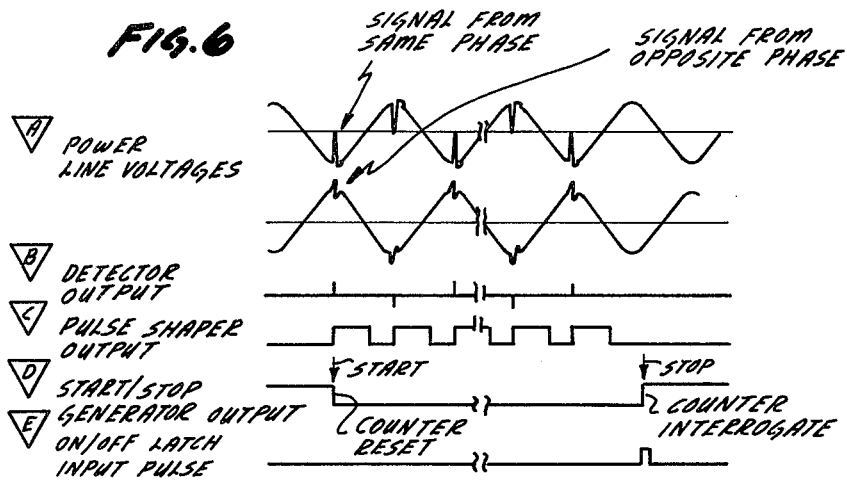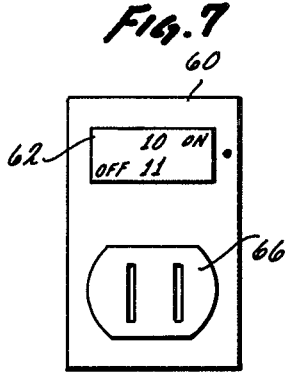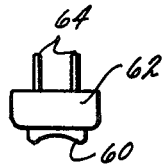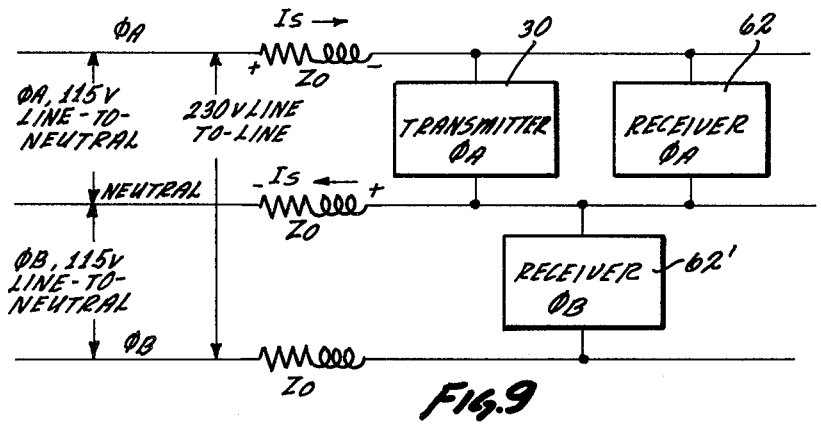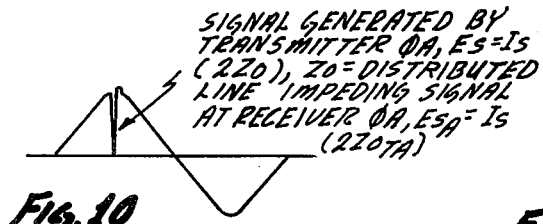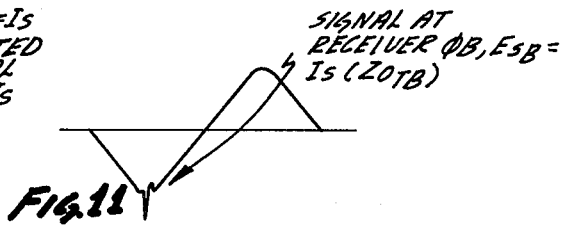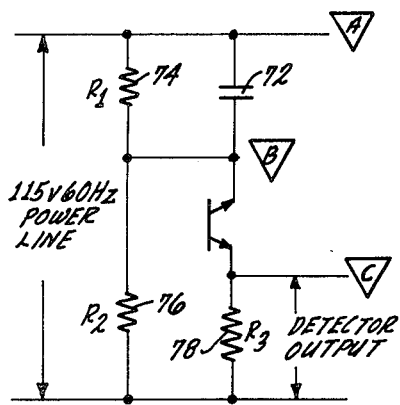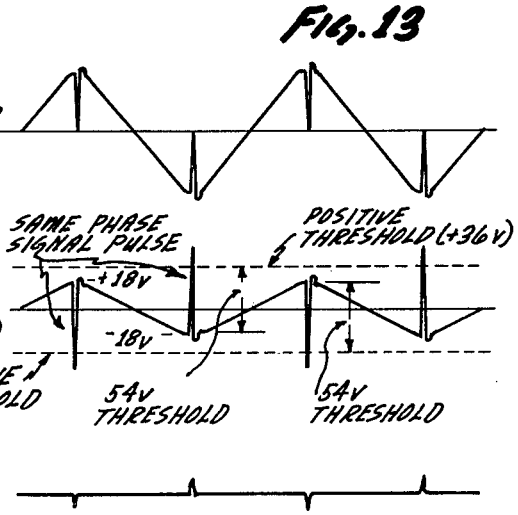

REMOTE AC POWER CONTROL WITH CONTROL PULSES AT THE ZERO CROSSING OF THE AC WAVE

This is a continuation of application Ser. No. 852,211 filed Nov. 17, 1977, now abandoned.

The present invention is directed to a system for providing the control of AC power at multiple remote locations. The remote control is provided from a single location to the remote locations and with the system using the existing AC power lines in a common power system for the transmission of control signals.

It is often desirable to be able to control the operation of a plurality of electrical or electronic devices at various remote locations from a single location. This may occur, for example, in a household which has an existing two-phase AC power system. Such systems have been proposed in the past and these systems use a variety of techniques for transmitting signals to the remote locations from the single control location. The present invention is directed to such a system which provides for such control and which uses as the signal carrier the existing AC power line extending throughout the household.

The specific type of system provided by the present invention produces an economical and reliable transmission and detection of coded signal pulses on a two-phase AC power line and with such a transmission and detection of the signal pulses in the presence of the random noise pulses which normally exist on the AC power line. These random noise pulses for example may be the type generated by the normal operation of household appliances which occur on a random basis. The present invention also provides for the transmission and detection of the signal pulses in the presence of continuous noise pulses which may be present on the AC power line. These continuous noise pulses may be such as those generated by household devices such as light dimmers. Another advantage of the system incorporating the present invention is that the transmitter and the various receivers which provide for the transmission and detection of the coded signal pulses may be located either on the same or on opposite phases of a two-phase AC power line system.

In general, the system of the present invention includes a transmitter located at a specific control location and any number of receivers which are located at individual remote locations and with the transmitter and the plurality of receivers all coupled across a common alternating current power system such as would be within a single household. The transmitter located at the control location includes a plurality of switches generally corresponding in number to the number of receivers and with the actuation of individual ones of the switches providing for a modulation of the AC power line with a series of control pulses unique to a particular switch and with each switch controlling a particular receiver.

Specifically, the actuation of an individual switch at the transmitter provides for a control of an "on" or "off" condition for the particular corresponding receiver. The corresponding receiver detects and decodes the coded control pulses from the AC power line in accordance with the particular control pulses received and thereby either activates or deactivates a power switch in the receiver so as to provide for the actuation and deactuation of a device coupled to the receiver.

The transmitter must share at least one common wire with each receiver but normally in a two-phase AC household power system all of the outlets throughout the house do share a common wire.

The present invention provides for the transmission and detection of the coded signal pulses so that these pulses are accurately detected even in the presence of noise and even if the transmitter and receiver are located either on the same or opposite phases of a two-phase system. Specifically, the present invention provides for means wherein the AC power line is initially modulated with a single pulse at each positive and negative peak of the AC wave. This may be accomplished by firing a breakdown device such as a triac or SCR located across the AC power line and with the breakdown device in series with a capacitor. When the breakdown device is fired, a high surge current is drawn by the capacitor which, in turn, modulates the AC line with a high frequency pulse.

In one embodiment of the invention, the receivers each include a detector which allows the signal pulses to pass at their full amplitude level but which attenuates the signal at the AC power frequency to a lower level. The detector thereby provides greater amplitude discrimination to in-phase signal pulses than to out-of-phase signal pulses so as to provide for equal amplitude signal pulses for both in-phase and out-of-phase detection. In addition, this type of detector system helps to discriminate against noise signals.

In a second and preferred embodiment of the invention, the breakdown device is fired at the positive and negative peaks of the AC wave to provide for the storage of energy in the charging capacitor substantially to one half of the peak to peak value of the AC power wave. However, the breakdown device is again fired at the zero crossing points for the AC signal so as to provide for a discharge of the energy stored by the capacitor onto the AC line thereby generating the control signal pulses at the zero crossing points having amplitudes substantially equal to one half of the peak to peak value of the AC power wave. The receivers include detectors which are enabled only at the zero crossing points so as to detect the presence of the control pulses only at that time. This again provides for equal signal amplitude for either in- or out-of-phase detection. In addition, the detection of the zero crossing points helps to discriminate against noise since such noise is normally lower in amplitude at the zero crossing points and since the detection is enabled only at the zero crossing points.

In addition, it is to be appreciated that instead of firing a single breakdown device at the positive and negative peaks of the AC wave, an alternative system is to fire a plurality of breakdown devices in sequence to charge a plurality of corresponding capacitors in sequence in the area of either a positive or negative peak. The high frequency sequential pulses produced by this alternative arrangement can be used as the control pulses as with the first embodiment of the invention, or the breakdown devices may be fired again in sequence in the area of a zero crossing to produce the sequential control pulses as with the second embodiment of the invention.

A clearer understanding of the invention will be had with reference to the following description and drawings wherein:

FIG. 1 illustrates a block diagram of a first embodiment of a transmitter for generating coded signal pulses on an AC power line;

FIG. 2 illustrates a series of waveforms which relate to specific portions of the diagram of FIG. 1 and which aid in the understanding of the operation of the transmitter of FIG. 1;

FIG. 3 illustrates a front view of a physical embodiment of the transmitter of FIG. 1;

FIG. 4 illustrates a side view of the transmitter of FIG. 3;

FIG. 5 illustrates a block diagram of a receiver constructed in accordance with the teachings of the present invention;

FIG. 6 illustrates a series of waveforms which aid in the understanding of the operation of the receiver of FIG. 5;

FIG. 7 illustrates a front view of a physical embodiment of a receiver constructed in accordance with the teachings of the present invention;

FIG. 8 illustrates a top view of the physical embodiment of the receiver of FIG. 7;

FIG. 9 illustrates the transmission of coded signal pulses and the detection of such signal pulses on either the same or opposite phase of the two-phase AC system;

FIG. 10 illustrates the coded signal pulse as received when the receiver is located across the AC line and is in-phase with the transmitter;

FIG. 11 illustrates the coded signal pulse when the receiver is located across the AC line and is out-of-phase with the transmitter;

FIG. 12 illustrates a specific embodiment of a detector which may be used with the receiver of FIG. 5 and which operates in conjunction with the first embodiment of the transmitter shown in FIG. 1;

FIG. 13 illustrates a series of waveforms which aid in the understanding of the operation of the detector of FIG. 12 when the receiver is in-phase with the transmitter;

Figure 14:
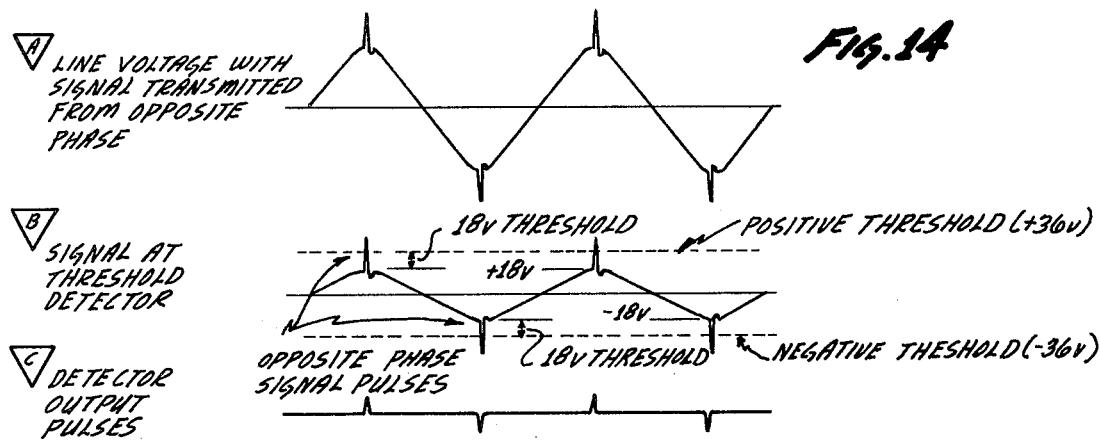
FIG. 14 illustrates a series of waveforms which aid in the understanding of the operation of the detector of FIG. 12 when the receiver is out-of-phase with the transmitter.

As can be seen in FIG. 1, the component portions of a first embodiment of a transmitter of the present invention are coupled across an existing AC power line 10 such as may exist within an ordinary household. The transmitter includes a DC power supply 12 to provide for a source of DC voltage. This DC voltage shown as +V is supplied to a sync pulse generator 14 and a code generator 16. The sync pulse generator 14 provides for sync pulses that are synchronized with the positive and negative peaks of the AC power wave so that these pulses occur at twice the line frequency.

The code generator 16 generates a unique code such as a particular pulse count for the various "on" or "off" positions of a plurality of input switches designated as No. 1, No. 2 and so on through to No. N. The positive DC voltage is also applied to these input switches so that, dependent upon the position of an individual one of the switches to the "on" or "off" position, a particular one of a plurality of inputs is supplied to the code generator 16. The output from the sync pulse generator 14 is also supplied to the code generator 16.

The output from the code generator 16 is used to control a breakdown device such as a triac 18. A capacitor 20 and a resistor 22 in combination with the triac 18 form a line modulator located across the AC power line 10. Specifically, when trigger pulses are provided from the code generator 16, this causes the triac 18 to fire and when the triac fires, the high surge current drawn by the capacitor 20 as it charges modulates the AC line 10 with a high frequency pulse. The resistor 22 allows the capacitor to recover by discharging the capacitor during the triac off-period. In this way, the AC line 10 is modulated with a single pulse at each positive and negative peak of the AC wave and with a particular number of pulses in accordance with the code generated by the code generator 16.

FIG. 2 illustrates a series of waveforms A, B, C and D which represent the signal at the corresponding positions shown in FIG. 1. Waveform A of FIG. 2 illustrates the AC power line and it can be seen at a plurality of positions and specifically at the positive and negative peaks of the AC waves a single pulse is formed as the capacitor 20 is charged. Waveform B illustrates the sync pulses generated by the sync pulse generator 14 and it can be seen that the sync pulses occur for every positive and negative peak of the AC power wave. The code pulses shown in waveform C are produced by the code generator 16 and the code pulses are in synchronization with the sync pulses shown in waveform B.

The code pulses are produced in a predetermined number in accordance with the particular one of the inputs to the code generator 16 from the individual switches Nos. 1, 2 through No. N. These switches are normally in the intermediate position as shown in FIG. 1, but by moving the switches to either the "on" or "off" position, this provides for a specific input to the code generator 16. The predetermined number of code pulses, such as shown in waveform C, provides for the firing of the triac 18 and for each code pulse and with a resultant waveform across the triac as shown in waveform D. Specifically until the triac is triggered, the waveform across the triac merely follows the AC power line waveform.

When the triac is fired, this causes a high charging current to be developed through the capacitor 20 so that the voltage across the triac is substantially zero. This produces the positive and negative pulses in the AC power line waveform as shown in waveform A. When the AC waveform next passes through a zero crossing, after having received a positive or negative pulse, the capacitor 20 starts to discharge back to the line through the resistor 22. This is shown in waveform D and is noted to be the capacitor discharge periods. Each time the triac is fired, a pulse is produced on the line and with a particular number of such pulses in accordance with the code generator 16 so as to produce a unique number of pulses on the AC line in accordance with the specific switch which is activated.

FIGS. 3 and 4 illustrate a specific physical configuration of a transmitter 30 which may house the various components as shown in FIG. 1. Specifically, the transmitter 30 may include a plurality of switches 32, 34 and 36 which may represent the switches Nos. 1, 2 through No. N shown in FIG. 1. FIG. 4 illustrates a top view of the transmitter 30 and shows the top switch 32 which is representative of the other switches and which may be a rocking type switch. This type of switch is normally spring loaded in a middle position as shown in FIG. 4 but can be rocked either to the right or left to activate the switch to produce "on" or "off" signals. A line plug 38 may be built into the back of the transmitter 30 as shown in FIG. 4 so that the transmitter 30 may actually be mounted right on a wall outlet. It is to be appreciated, however, that a line cord may also be used so that the transmitter may be located some distance away from a wall outlet.

As shown in FIG. 3, the switch 32 is marked with the Nos. 10 and 11 next to the "on" and "off" positions. This may represent, for example, that when the switch 32 is rocked to the right to an "on" position, an input is provided to control the code generator 16 to produce a series of ten (10) pulses on the AC line. If the switch 32 is rocked to the left to the "off" position, an input is provided to control the code generator to produce a series of eleven (11) pulses on the AC line. The switch 32 and the other switches return to the central position shown in FIG. 4 once the pressure on the switch is released. A sensitive receiver which will be described in a later portion of this specification is sensitive to the detection of ten (10) or eleven (11) pulses on the AC line so as to provide for the receiver to either actuate or deactuate a load device coupled to the receiver. The other switches 34 and 36 control similar complementary receivers and have unique codes for each switch position as shown in FIG. 3.

FIG. 5 illustrates a block diagram of a receiver which may be used to provide for a detection of the coded signal pulses produced either by the transmitter of FIG. 1 or by other transmitter embodiments. In FIG. 5, a DC power supply 40 produces a DC voltage designated as +V and supplies such voltage to a pulse shaper 42, a counter decoder 44 and an on-off latch 46. In addition, the receiver of FIG. 5 includes a signal detector 48 coupled across the AC power line 10.

The signal detector 48 detects the specific coded pulse signals on the AC power line and supplies these pulses to the pulse shaper 42. The pulse shaper 42 stretches the pulses and supplies the pulses to the counter decoder 44 and to a start-stop generator 50. The start-stop generator detects the first pulse that occurs after the absence of one or more signal pulses and generates a counter decoder start signal which resets the counter decoder 44.

The start-stop generator 50 also detects the absence of a signal pulse and controls the counter decoder to produce an output signal through either an "on" gate 52 or an "off" gate 54 when the counter decoder has counted a predetermined number of signal pulses which correspond to a particular number of pulses for each receiver. If a correct count has occurred, the signal supplied through the "on" or "off" gates 52 and 54 control the on-off latch 46 so as to either activate or deactivate a solid state relay 56. A load 58 is coupled through the relay 56 to be across the AC power line 10 and if, as an example, the relay 56 is activated, the load will therefore be coupled across the AC power line. If the relay 56 is deactivated, the load, of course, will be disconnected from the AC power line. The receiver shown in FIG. 5 may also be controlled directly by a switch 60 which is similar to the switches shown in FIGS. 3 and 4 and which can directly control the on-off latch 46 to control the solid state relay 56.

FIG. 6 illustrates various waveforms which are used in explaining the operation of the receiver of FIG. 5. Waveform A illustrates the two possible waveforms which may be presented to a receiver across one of the phases of a two-phase AC power line. Since most AC power systems are two phase, the receiver can either be in-phase with the transmitter or the receiver can be out-of-phase with the transmitter. In either case, the signal detector 48 is designed to produce a detector output as shown in waveform B of FIG. 6. It can be seen in waveform B that a signal pulse is present from the signal detector 48 in accordance with the presence of the signal pulses in the AC power line.

The output from the pulse shaper 42 is shown in waveform C of FIG. 6 and it can be seen that the pulses from the signal detector 48 are stretched to form square pulses and with all of the square pulses of the same polarity. The number of these square pulses correspond in number to the number of pulses produced by the signal detector 48. The output from the start-stop generator 50, which is applied to the counter decoder 44, is shown in waveform D of FIG. 5.

It can be seen that the start-stop generator 50 produces a signal for the counter decoder 44 to be reset and thereby start to count the pulses produced by the pulse shaper 42. This occurs immediately with the coupling of the first pulse to the start-stop generator 50 from the pulse shaper 42 and when there had been no previous pulse on the AC line. The start-stop generator continues to maintain the counter decoder 44 in an activated state until no more pulses are coupled to the start-stop generator from the pulse shaper 42. At that time, the counter decoder 44 is deactivated. Each receiver on the line includes a counter decoder 44 which is preset to two predetermined counts. If the counter decoder 44 counts either of the two preset numbers of counts between the start and stop period controlled by the start-stop generator 50, then an output signal such as shown in waveform E of FIG. 6 is produced for coupling to either of the two separate gates 52 and 54. The gates control the on-off latch 46 to be either "on" or "off" so as to also control the solid state relay 56 to be "on" or "off". In this way, each receiver is responsive to unique signal codes to control the operation of the load 58 coupled to the receiver.

A specific embodiment of a physical structure of a receiver may be seen with reference to FIGS. 7 and 8. In FIG. 7 a receiver 62 includes the switch 60 shown in FIG. 5. The switch 60 may be used to override the remote operation of the receiver 62 so as to either switch a load "on" or "off" directly at the location of the receiver 62. The receiver 62 may be coupled directly to an AC line using a built in plug 64 as shown in FIG. 8, but, again, it is to be appreciated that a power cord may be used with a line plug at its end.

The load such as the load 58 shown in FIG. 5 may be coupled to the receiver through an AC socket 66 which is part of the receiver 62. As shown in FIG. 7, the receiver 62 may respond to a signal code of ten (10) pulses to be "on" and eleven (11) pulses to be "off" so as to correspond to the particular code for the transmitter shown in FIG. 3. It is also to be appreciated that a plurality of such receivers corresponding in number to the number of switches present on the transmitter 30 shown in FIG. 3 would be used so as to provide for the actuation of a plurality of such receivers 62 from a single control location for the transmitter 30.

FIG. 9 illustrates a schematic diagram showing the power line modulation and with the transmitter on one phase of a two-phase power line and with the receivers on both phases of the two-phase power line. Specifically, as shown in FIG. 9, the transmitter 30 and one receiver 62 are connected to phase φA of the two-phase power line and another receiver 62' connected to φB of the two-phase power line. The distributed line impedance at the signal frequency is assumed to be Zo for all three lines and the instantaneous signal current is shown to be Is. Assuming also that the signal occurs at the positive peak of the AC wave, the voltage drop across the impedance Zo is the product of the current and the impedance and the voltage signal at the transmitter goes from the AC peak voltage to ground as shown in FIG. 10 and includes the pulse portion at the peak in accordance with the charging of the capacitor 20 shown in FIG. 1. The magnitude of the voltage across the transmitter is Es=Is (2Zo).

The signal voltage at the receiver φA is of the same polarity and the magnitude is $Es_A$=Is $(2Z_{OTA})$ where $Z_{OTA}$ equals the distributed line impedance common to the transmitter φA and the receiver φA.

The signal voltage at the receiver φB is of the opposite phase to the transmitter, as shown in FIG. 11, and the amplitude of this signal voltage is $Es_B$=Is $(Z_{OTB})$ where $Z_{OTB}$ is that part of the distributed line impedance Zo that is common to both the transmitter φA and the receiver φB. Normally, we would assume that $Z_{OTA}$ and $Z_{OTB}$ would be equal and in that case the signal at the receiver φB is only half that of the signal at the receiver φA. Therefore, in order to provide for equal signal detection in receivers that are both in and out of phase with the transmitter, the signal detector must provide greater amplitude discrimination to in-phase signal pulses than out-of-phase signal pulses. In order to provide for such signal detection, a signal detector such as shown in FIG. 12 may be used for the signal detector 48 of FIG. 5. The circuit shown in FIG. 12 provides for selective amplitude discrimination between in-phase signal and noise pulses and out-of-phase signal and noise pulses.

The circuit of FIG. 12 uses a bilateral voltage breakdown device such as a diac 70. The device 70 exhibits a negative resistance characteristic at a specific breakover voltage for both the positive and negative polarity. In this way, the device 70 has a high impedance to voltages whose absolute value is below the breakover voltage and a negative resistance to voltages greater than the breakover value. The device 70 is symmetrical for both positive and negative voltages and thereby provides the positive and negative threshold levels for the detector of FIG. 12.

In the circuit of FIG. 12 a capacitor 72 filters out the AC power frequency and allows the signal pulses to pass to and be coupled across the diac 70. A resistor divider network 74 and 76 restores a fixed portion of the AC power frequency to be coupled across the diac 70. The output of the detector circuit is taken across a resistor 78. By coupling the signal pulses to the diac and by allowing only a portion of the AC power frequency to the diac, this provides for a greater amplitude discrimination to in-phase signal and noise pulses then to out-of-phase signal and noise pulses. This may be seen, for example, with reference to FIGS. 13 and 14 which illustrate the detector waveshapes for both the in-phase and out-of-phase signals.

The waveshapes shown in FIGS. 13 and 14 appear at the correspondingly marked parts of the circuit of FIG. 12. For example, the in-phase and out-of-phase signal present on the AC line is shown in waveshape A of FIGS. 13 and 14. The waveshape present across the diac 70 is shown in waveshape B of FIGS. 13 and 14 and it can be seen that these waveshapes include the full value for the AC pulses and a portion of the AC power frequency. As an example, if we assume that the diac 70 breakover voltage is ±36 volts, the positive and negative threshold for the detector is set at ±36 volts as shown in waveforms B of FIGS. 13 and 14. Also if the ratio of resistors 74 and 76 is set so that the peak AC power wave at the diac 70 is ±18 volts, then the threshold to in-phase signal and noise is 54 volts as shown in waveform B of FIG. 13 and the threshold to out-of-phase signals and noise is 18 volts as shown in waveform B of FIG. 14. In this way, the amplitude of the output signal pulses shown in waveform C of FIGS. 13 and 14 is substantially the same for both in-phase and out-of-phase signals.

Figure 15:
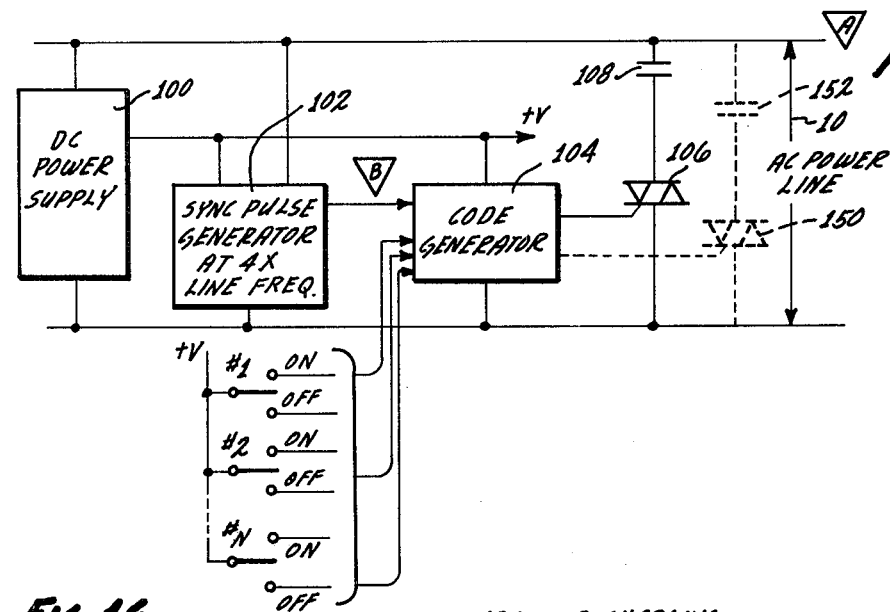
FIG. 15 illustrates a block diagram of a second embodiment of a transmitter for providing coded signal pulses on an AC power line.

FIG. 15 illustrates an alternative embodiment of a system providing for the control of AC power at multiple remote locations from a single location and specifically discloses an alternative design for a transmitter. In the embodiment of FIG. 15, a DC power supply 100 supplies DC power for a sync pulse generator 102 and a code generator 104. The sync pulse generator 102 is also coupled to the AC power line and provides for a plurality of trigger pulses for the code generator 104 at four times the AC line frequency. In addition, a plurality of switches designated Nos. 1, 2 through No. N provide for input signal to the code generator. The code generator 104 provides a particular number of output trigger pulses for a breakdown device, such as a triac 106, in accordance with the sync pulses from the sync pulse generator 102 and with the particular input from one of the switches Nos. 1, 2 through No. N.

Figure 16:
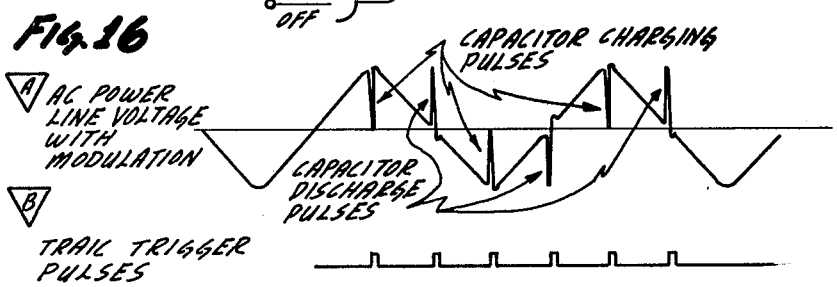
FIG. 16 illustrates a series of waveforms which aid in the understanding of the operation of the transmitter of FIG. 15.

The sync pulses are shown in waveform B of FIG. 16 and with waveform A of FIG. 16 showing the resultant output signal on the AC power line 10. Specifically, it can be seen with a comparison of waveforms A and B of FIG. 16 that a sync pulse occurs at every positive and negative peak and every zero crossing of the AC power wave. The code generator 104 thereby provides for a triggering of the triac 106 at both the peaks and the zero crossings of the AC power wave and with the triac triggered a particular number of times, in accordance with the input from the particular one of the switches No. 1, No. 2 through No. N which is activated.

In the transmitter of FIG. 15, the triac 106 is initially triggered at the peak of the AC wave so as to provide for a charging of a capacitor 108 in a similar manner to that shown with reference to the transmitter of FIG. 1. This charging is either positive or negative substantially to one half of the peak to peak value of the AC power wave as shown in waveform A of FIG. 16. The triac is again triggered at the zero crossings at which time the capacitor will become discharged onto the AC line to generate the signal pulses at the zero crossings which, as shown in FIG. 16, have amplitudes substantially equal to one half of the peak to peak value of the AC power wave. These signal pulses at the zero crossings actually become the pulses which are to be detected by the receivers. In this way noise pulses are substantially inhibited at the receiver since very little noise normally occurs at the zero crossings. Also the receiver does not have to discriminate between in-phase and out-of-phase signals since the signal pulses at the zero crossings are the same for both in- and out-of-phase locations of the receivers. The receivers may be of a type known in the art including a detector which is enable only at the zero crossing points so as to detect the presence of the control pulses only at that time.

The present invention therefore provides for a system for producing the control of AC power at multiple remote locations from a single location using the existing power line as a signal carrier and wherein the system is relatively immune to noise on the power line and wherein the system compensates for differences which could occur in the reception of signal pulses when the transmitter and the receivers are located on either the same or opposite phases of a two-phase power line system.

It is to be appreciated that alternative arrangements of the system of the present invention may be made. As an example, instead of firing a single breakdown device at the positive and negative peaks of the AC wave, an alternative arrangement is to fire a plurality of breakdown devices in sequence to charge a plurality of corresponding capacitors in sequence. This is shown, for example, in FIG. 15 in dotted lines by an additional breakdown device 150 and additional capacitor 152. It is to be appreciated that any number of such breakdown devices and capacitors may be used.

As a specific example, five such breakdown devices and capacitors may be used to produce five sequential pulses. The first pulse represents the appearance of a coded signal and the remaining four pulses provide a binary code to provide sixteen (16) possible states. In the alternative arrangement of the embodiment shown in FIG. 15, the plurality of breakdown devices are fired again in sequence around a zero crossing point to provide the control pulses. The sequential control pulses would be detected as shown in this application and decoded using conventional circuitry.

It is also to be appreciated that the first embodiment of the invention may also have an alternative arrangement as described above wherein the plurality of sequential high frequency pulses in the area of the positive or negative peak serve as the control pulses.

Although the invention has been described with reference to particular embodiments, it should be appreciated that various adaptations and modifications may be made and the invention is only to be limited by the appended claims.

We claim:

1. In a remote control for providing the control of AC power transmitted as an AC power wave and with the AC power wave alternating through peak points of opposite polarity and with zero crossing therebetween at a remote location from a control location and using the AC power wave of an existing AC power line for the transmitting of control signals from the control location to the remote location, a transmitter for location at the control location and for coupling to the AC power line, the transmitter providing a predetermined number of control pulses to the AC power line for transmission along the AC power line upon actuation of the transmitter, the transmitter including at least one bidirectional breakdown device and at least one capacitor in series across the AC power line and means for triggering of the at least one bidirectional breakdown device only at at least one peak point of the AC power wave and with the triggering corresponding to the predetermined number of control pulses for providing a charging of the at least one capacitor to a voltage equal substantially to the voltage with respect to zero of said peak point of the AC power wave in accordance with the predetermined number of control pulses and for triggering of the at least one bidirectional breakdown device only at at least one zero crossing of the AC power wave and with the triggering corresponding to the predetermined number of control pulses for providing a discharging of the at least one capacitor in accordance with the predetermined number of control pulses for producing control pulses having amplitudes substantially equal to the amplitude with respect to zero of the peak points of the AC power wave only at the zero crossing of the AC power wave.

2. The remote control of claim 1 wherein the transmitter provides different predetermined numbers of control pulses for controlling the supply or discontinuance of the supply of AC power.

3. The remote control of claim 1 including a single bidirectional breakdown device and a single capacitor and with triggering at a predetermined number of peak points and zero crossings corresponding to the predetermined number of control pulses.

4. The remote control of claim 1 including a plurality of bidirectional breakdown devices and a corresponding plurality of capacitors and with triggering only at at least one peak point and zero crossing.

5. In a remote control for providing the control of AC power transmitted as an AC power wave on an AC power line and with the AC power wave alternating through peak points of opposite polarity and with zero crossings therebetween to a load at a location remote from a control location and transmitting of high frequency signal pulses from the control location to the remote location along the AC power line, a transmitter for locating at the control location and coupled across the AC power line, the transmitter producing a predetermined number of high frequency pulses on the AC power line for transmission along the AC power line upon actuation of the transmitter, the transmitter including a bidirectional breakdown device and a capacitor in series across the AC power line and including first means for triggering the breakdown device only at a least one peak point of the AC power wave for charging the capacitor to a voltage equal substantially to the voltage with respect to zero of said peak point of the AC power wave, and including, second means for triggering the breakdown device only at the zero crossing points of the AC power wave to discharge the capacitor for providing high frequency pulses only at the zero crossing points, having amplitudes substantially equal to the amplitudes with respect to zero of the peak points of the AC power wave.

6. The remote control of claim 5 including a plurality of bidirectional breakdown devices and a corresponding plurality of capacitors and with the first means including means for triggering the breakdown devices for charging the capacitors and with the second means including means for triggering the breakdown devices for discharging the capacitors.

7. The remote control of claim 5 wherein the transmitter provides different predetermined numbers of high frequency pulses for controlling the supply or discontinuance of the supply of AC power to the load.

* * * * *